Jan. 10, 1961    N. KONTAXES    2,967,411
ELECTRICAL CONTROL CIRCUIT FOR KNITTING MACHINES
Filed June 24, 1957    2 Sheets-Sheet 1
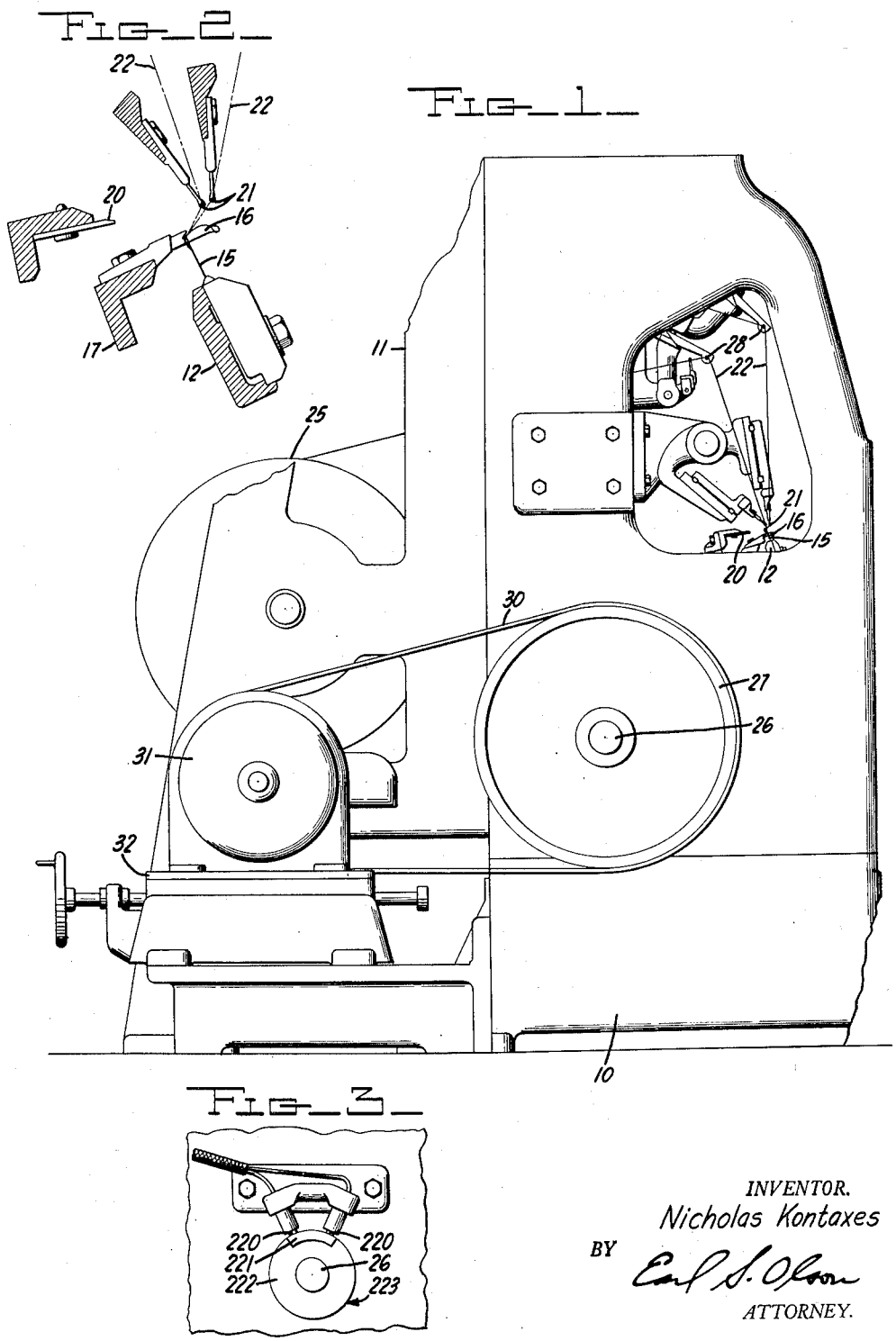
INVENTOR.
Nicholas Kontaxes
BY
ATTORNEY.

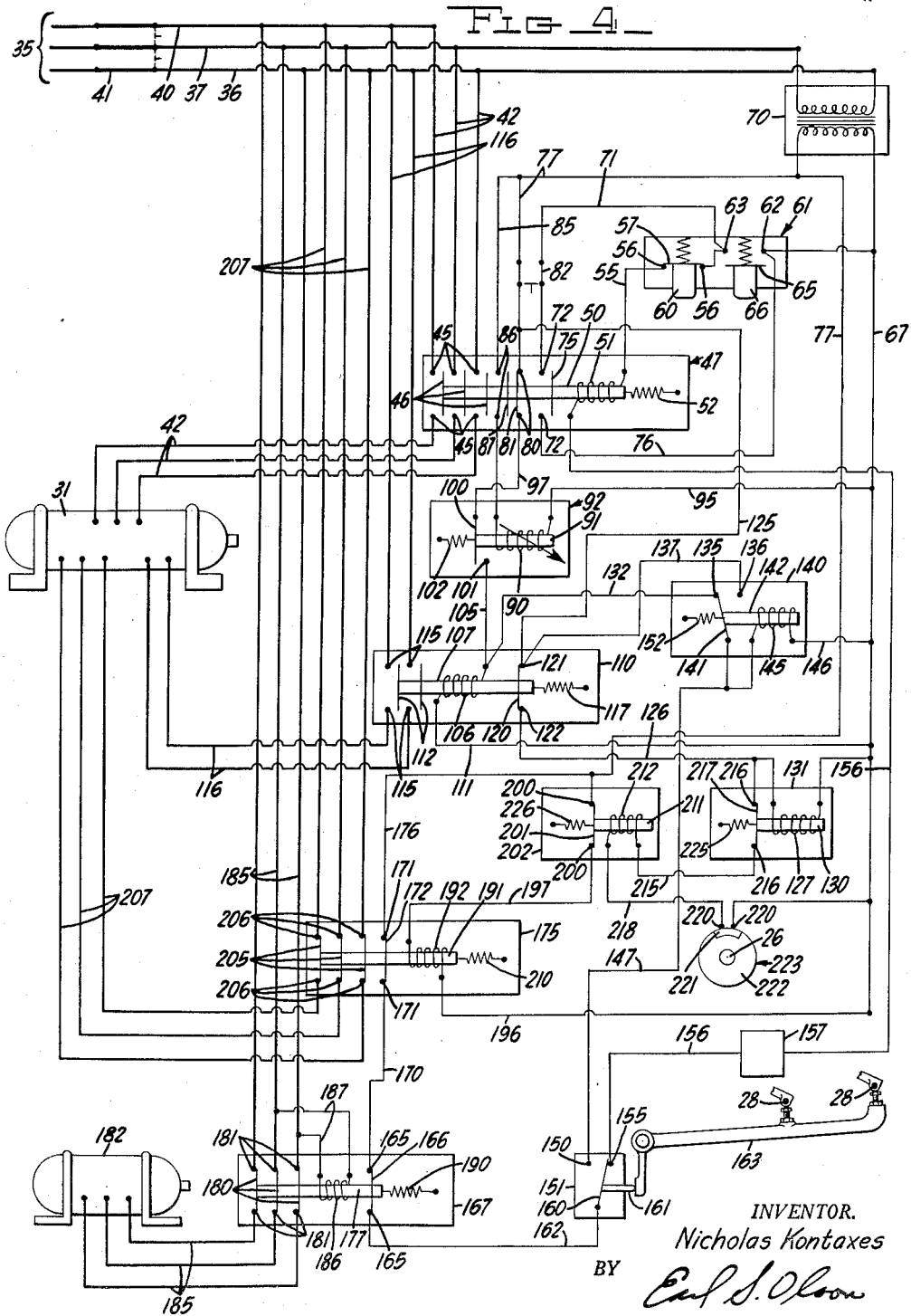

United States Patent Office 2,967,411
Patented Jan. 10, 1961

2,967,411

ELECTRICAL CONTROL CIRCUIT FOR KNITTING MACHINES

Nicholas Kontaxes, Reading, Pa., assignor to Textile Machine Works, Wyomissing, Pa., a corporation of Pennsylvania Filed June 24, 1957, Ser. No. 667,391

8 Claims. (Cl. 66—86)

This invention relates to driving means for a high speed knitting machine and more particularly to electrical control means for such driving means which is adapted to function to bring the machine to a stop, from high speed operation, with the parts in a predetermined point in an operating cycle of the parts.

In knitting machines of the tricot type which operate at high speed, many of the operating parts of the machines such as the means for feeding and tensioning a sheet of yarns to the knitting elements are under the control of safety devices which act automatically when such means become defective in operation to interrupt the operation of the driving means and bring the machine to a stop. The driving means of such machines are also under manually operated controls by means of which the machine may be started for full speed operation and stopped when desired or may be operated only in steps or through partial cycles, commonly referred to as jogging. Preferably, when the machine is stopped by the operation of either the automatic or manual control means it is essential that the stopping occur in the shortest possible time and with the fabric forming elements in positions to facilitate repairs to and replacement of the elements when necessary.

Heretofore, in one form of means for braking the motor and machine to a stop, the operating motor was provided with plugging means which acted to reverse the direction of the motor. However, in addition to being unreliable in operation this type of braking means in some instances also caused a reverse movement of the machine which resulted in damage thereto and very often the tearing of the entire sheet of yarns. In another arrangement the driving motor was connected to the driving shaft by a clutch mounted on the driving shaft together with a friction disc type braking means. Electrical control means acted to release the clutch and apply the braking means to stop the machine in a predetermined part of an operating cycle. With this latter type of braking means, the slippage encountered during the initial stages of the braking action not only caused rapid wear in the discs and inaccurate stopping of the machine, but also resulted in a considerable loss of production due to the difficulties encountered in making repairs to and in replacing worn parts.

It is an object of the invention to provide a high speed knitting machine with driving means that will overcome the above mentioned and other difficulties encountered in bringing the machine to a stop from high operating speeds.

Another object of the invention is to provide a high speed tricot knitting machine with an electrical operating motor having both electrical and mechanical braking means for bringing the motor and machine to a stop.

A further object of the invention is to provide a high speed tricot knitting machine with an operating motor having both electrical and mechanical braking means, and means for controlling the operation of both braking means in a manner to greatly reduce the time required to bring the machine to a stop from normal high speed operation.

A still further object of the invention is to provide a high speed tricot knitting machine with an operating motor having electrical and mechanical braking means which is not only economical but also accurate in operation in stopping the machine with the knitting element at a particular point in their operating cycle.

With these and other objects in view which become apparent from the following detailed description of the illustrative embodiment of the invention shown in the accompanying drawings, the invention resides in the novel elements, features of construction and cooperation of parts, as hereinafter more particularly pointed out in the claims.

In the drawings:

Figure 1 is a partial end elevational view of a tricot knitting machine showing the driving means of the machine, the operation of which is controlled according to the invention;

Fig. 2 is a cross-sectional view on an enlarged scale taken transversely through the loop forming and yarn feeding means of the machine shown in Fig. 1;

Fig. 3 is a detailed view of one of the control elements for the driving means; and Fig. 4 is a diagrammatic view of the electrical control circuit for the driving means of the machine.

Referring to the drawings and particularly to Figs. 1 and 2, there is shown a portion of a warp or tricot knitting machine including a base member 10, and end frames, one of which is shown at 11, the base member and end frames forming the usual framework of the machine for supporting the loop forming mechanisms including a needle bar 12 having spring beard needles 15, sinkers 16 carried on a bar 17, a presser member 20 for closing the beards of the needles, and guides 21 for feeding yarns 22 to the needles. The yarns 22 are carried on beams, one of which is shown at 25 and yarns from each beam pass over a tension rod device 28 to the loop forming mechanism. The loop forming mechanism is operated to form the yarns into fabric by camshafts (not shown) which are rotated by a drive shaft 26 supported in the end frames 11. The shaft 26 carries a pulley 27 which is connected by a belt 30, preferably of the V-type, to a pulley (not shown) secured to the shaft of a motor 31. The motor 31 is carried on an adjustable table 32 secured to the base member 10.

Preferably, the motor 31 is of a known non-reversible type having both electrical and mechanical braking means incorporated therein for bringing the motor to a stop, such for example as the type M Unibrake A.C. motor manufactured by The Master Electric Company of Dayton, Ohio. In such motors the electrical braking means is in the form of special windings which act to dissipate the electro-motive force, generated during operation of the motor, at a faster than normal rate and to apply a magnetic force to the rotor of the motor to thereby reduce the time necessary to stop the motor. The mechanical braking means is usually in the form of a plurality of friction discs which are released from frictional engagement, during operation of the motor, by magnetic means. When the motor is to be stopped, the electrical circuit for the motor is opened and both electrical and mechanical braking means then acting to bring the motor to a stop in a manner hereinafter set forth.

The motor 31, according to the instant invention, is in an electrical circuit, shown diagrammatically in Fig. 4, including main conductors of a three-phase source of electrical energy indicated at 35 which are connected to buses 36, 37 and 40 through a main safety switch 41. The main operating winding of the motor 31 is connected to the buses 36, 37 and 40 by leads 42 which pass through stationary contacts 45 and movable contacts 46 of a switch 47. The movable contacts 46 are carried on or connected to a core member 50 which is adapted to be operated by a coil or winding 51 when the coil is energized to move the movable contacts 46 into engagement with the stationary contacts 45 to close the circuit to the motor. The core member 50 is biased by a spring 52 in a direction to disengage the stationary and movable contacts when the coil 51 is deenergized. The coil 51 is in a control circuit including a lead 55 which is connected to and passes through stationary contacts 56 and a movable contact 57 carried on a stop button 60 of a start and stop switch 61, these stationary and movable contacts being normally biased to closed position as indicated in Fig. 4. From the stationary contacts 56 the circuit for the coil 51 continues through stationary contacts 62 and 63 and a normally disengaged movable contact member 65 carried by a start button 66 of the switch 61. The stationary contact 62 is connected to a lead 67 which is in turn connected to a transformer 70. The transformer 70 is connected to buses 36 and 37 and is adapted to reduce the voltage from the main conductors 35 to that required in the control circuit.

The stationary contact 63 is connected by a lead 71 through stationary contacts 72 and a movable contact member 75 which is connected to the core member 50. The circuit through stationary contacts 72 is completed through lead 76 to the stationary contact 62. The transformer 70 is connected by a lead 77 through stationary contacts 80 and a movable contact member 81 which is connected to the core member 50 of the switch 47. A switch 82 is connected in the leads 71 and 77 to the stationary contacts 72 and 80, respectively, for a purpose hereinafter set forth. The lead 77 is connected by a lead 85 through stationary contacts 86 and a movable contact member 87, carried on the core member 50 of the switch 47, to a coil or winding 90 for a core member 91 of a relay 92. The circuit through coil 90 is continued by a lead 95 to the lead 67 connected to the transformer 70. The circuit through the coil 90 is controlled by a potentiometer which acts to maintain the coil energized for a predetermined time interval after the circuit is broken through the stationary contacts 86 and movable contact member 87 for purposes hereinafter set forth.

The circuit through stationary contacts 80 is continued by a lead 97 to a movable contact 100 which is connected to the core member 91. The movable contact 100 is adapted to be moved to engage a stationary contact 101 by the movement of the core member 91 to the right when the circuit for the coil 90 is energized and is biased to open position by a spring 102 when the coil 51 is de-energized. The stationary contact 101 is connected by a lead 105 to one end of an operating coil or winding 106 for a core member 107 of a switch 110, the other end of the coil being connected to the lead 67 by lead 111. The core member 107 is provided with movable contacts 112 which are moved into engagement with stationary contacts 115 to close a circuit from buses 36 and 40 through leads 116 to energize the electrical braking means for the motor 31. A spring 117 connected to the core member 107 biases the core member to disengage the movable contacts 112 from the stationary contacts 115 when the circuit through the coil 106 is open.

The core member 107 has a contact member 120 which is adapted to bridge stationary contacts 121 and 122, the contact 121 being connected to the lead 77 between the switches 47 and 82 by a lead 125. The stationary contact 122 is connected by lead 126 through an operating coil or winding 127, for a core member 130 of a relay 131, to the lead 67. The coil 106 is also connected by a lead 132 to a stationary contact 135, and a second stationary contact 136 is connected by a lead 137 to the contact 121 of the switch 110. The contacts 135 and 136 form a part of a relay 140 and are adapted to be selectively engaged by a movable contact member 141 which is connected to a core member 142. An operating coil or winding 145 for the core member 142 is in a circuit including a lead 146 connected to the lead 67 and a lead 147 connected to one stationary contact 150 of a switch 151 which is operated to stop the motor 31 when excessive tension is applied to the yarns 22 as hereinafter set forth. The core member 142 of relay 140 is biased by a spring 152 to move the contact 141 into engagement with the stationary contact 135 when the circuit through the coil 145 is de-energized and the core member is moved to engage the contact 141 with the stationary contact 136 when the coil is energized. Relays 131 and 140 are of a known type such as those sold in the trade as "Silic-O-Netic" manufactured by the Heinemann Electric Company, of Trenton, New Jersey. Relays of the known type are provided with means for causing a controlled time lag between the energization of the coils and the movement of the core members. This feature is employed in the instant invention for purposes hereinafter set forth.

The switch 151 has a second stationary contact 155 which is connected by a lead 156 to the coil 51 through a series of safety stop switches, indicated diagrammatically at 157, which are for the purpose of stopping the motor when the operation of various operating parts of the machine becomes defective. These stop switches are not specifically shown as their construction and operation whereby they are opened by the defective operation of the parts with which they are respectively concerned is well known in the art. The switch 151 is of the snap type and has a movable contact 160 which is normally positioned to engage the stationary contact 155 when the yarns 22 are being fed to the loop forming elements of the machine with normal tension. A button 161 of the switch 151 is adapted to be operated by a lever 163 which is pivotally mounted in a fixed part of the machine. The lever 163 is in turn actuated by either one or the other of the tension rods for the yarns, when tension in the yarns becomes excessive, as diagrammatically illustrated in Fig. 4, to move the movable contact 160 into engagement with the contact 150. The movable contact 160 is connected by a lead 162 through stationary contacts 165 and a movable contact 166 of a switch 167. The stationary contacts 165 are connected by a lead 170 through stationary contacts 171 and a movable contact 172 of a switch 175. From the contact 171 of the switch 175 the circuit continues through lead 176 to the lead 77.

The movable contact 166 of the switch 167 is connected to or carried by a core member 177 which also carries three movable contacts 180 adapted to engage stationary contacts 181 to close a circuit from a motor 182 through three leads 185 to the buses 36, 37 and 40. The motor 182 operates an oil pump (not shown) for force feeding lubricant to the drive shafts and other operating parts of the machine. The core member 177 is operated by a coil or winding 186 which is connected by leads 187 to two of the leads 185, to normally maintain the movable contacts 166 and 180 in engagement with the stationary contacts 165 and 181, respectively. A spring 190, connected to the core member 177, acts to bias the core member and disengage the movable contacts from their associated stationary contacts to break the circuits to the motor 182 and coil 51 when for any reason the circuit for the motor 182 becomes defective.

The movable contact 172 of the switch 175 is connected to a core member 191 having an operating coil or winding 192 which is in a circuit extending from lead 67 through lead 196 to the coil and from the coil through lead 197 and through stationary contacts 200 and a movable contact 201 of a relay 202 to the lead 176. The core member 191 of switch 175 also carries three movable contacts 205 which are adapted to engage stationary contacts 206 to close a circuit from buses 36, 37 and 40 through leads 207 to the mechanical braking means for the motor 31, hereinbefore set forth. A spring 210 connected to the core member 191 biases the core member to disengage the movable contacts 172 and 205 from the stationary contacts 171 and 206, respectively, to open the circuit through the coil 51 and through the circuit controlling the mechanical braking means for the motor 31 when the circuit through the coil 192 is de-energized, as hereinafter set forth.

The movable contact 201 of the relay 202 is connected to a core member 211 having an operating coil or winding 212. The circuit for the winding 212 starts at lead 126 and extends through a lead 215, stationary contacts 216 and a movable contact 217 connected to the core member 130 of relay 131, to the winding 212. From the winding 212 the circuit continues through a lead 218, stationary contacts 220 and a metallic conductor 221 to the lead 67. The conductor 221 is in the form of a segment which is carried on a flange 222 of insulating material such as fibre or the like secured to the shaft 26 (Figs. 3 and 4) or to one of the aforesaid camshafts, whereby the segment is rotatable into and out of a position to close the circuit between contacts 220. The stationary contacts 220 and conductor 221 act as a sensing device, indicated as a whole by reference character 223, in the manner and for the purposes hereinafter set forth.

A spring 225 connected to the core member 130 of relay 131 biases the core member to engage the movable contact 217 with the stationary contacts 216 when the circuit through the coil 127 is de-energized. Likewise, a spring 226 is connected to the core member 211 of relay 202 to bias the core member to engage the movable contact 201 with the stationary contacts 200 when the circuit through the coil 212 is de-energized.

When it is desired to start the machine the main switch 41 is closed to energize the buses 36, 37 and 40 and also to energize the control circuit through the transformer 70 and the transformer leads 67 and 77. Simultaneously, with the closing of the circuit to the buses, the circuit through leads 185 and 187 is energized to energize the coil 186 which operates the core member 177 to close the circuit through movable and stationary contacts 180 and 181, respectively, of the switch 167 to start the motor 182 for the oil pump. At the same time the circuit is energized from lead 67, through lead 196, coil 192, lead 197 and the normally closed relay 202, and through lead 176 to lead 77 to operate the switch 175 to close the circuit from the buses through leads 207 to operate the release for the mechanical braking means of the motor 31. Closing of the switches 167 and 175 closes the circuit from the coil 51, through the lead 156, through the series of safety stop switches 157, the stationary and movable contacts 155 and 160, respectively, of switch 151, the leads 162 and 170, the switches 167 and 175 and through the lead 176 to the lead 77. At this time, however, the circuit for the coil 51 is not energized because the circuit extension through the normally closed stop button 60 is open at the normally open start button 66 and the holding circuit through the normally closed stop button 60 to the lead 67 is open at the switch 47. Also at this time the circuit for the coil 90 of the relay 92 is open at the switch 47, the circuit for the coil 106 is open at the relay 92, the secondary circuit for the coil 106 including the coil 145 of the relay 140 is open at the switch 151, the circuit from the buses to the electrical braking means for the motor is open at the switch 110, and the circuit for the coil 127 is closed through the switch 110 to operate the relay 131 to open the circuit through the coil 212.

Upon depressing the start button 66, the circuit extension for the coil 51 is closed through the stop and start buttons 60 and 66, respectively, to energize the coil 51 and operate the switch 47. Operation of the switch 47 closes the holding circuit for the coil 51 through the stop button 60 and switch 47 to maintain the coil energized when the start button 66 is released. Operation of the switch 47 also closes the circuit from the buses 36, 37 and 40, through the leads 42 to start and operate the motor 31. Operation of the switch 47 also closes and energizes the circuit through the switch to the coil 90 to operate and close the relay 92 to the coil 106 for the switch 110. However, the coil 106 remains de-energized at this time because the circuit through the relay 92 is open at the switch 47 and the secondary circuit through relay 140 remains open at the switch 151. The motor 31 continues in operation until the circuit through the coil 51 is opened by depressing the stop button 60 or by opening the circuit because of the actuation of any of the safety switches 157 or by opening the circuit at the switch 151. The latter occurs when the contact 160 is moved by button 161 to disengage the contact 155 and to engage the contact 150 when tension in the yarns 22 becomes excessive, as hereinbefore set forth.

When the circuit through the coil 51 of the switch 47 is de-energized by depressing the stop button 60 or when the circuit is opened by actuation of one of the safety switches 157, the core member 50 is biased by the spring 52 to open the circuit through leads 42 to the motor 31, to open the holding circuit of the switch for the coil 51, to close the circuit through the movable contact 100 and contact 101 of the relay 92 to the coil 106 of the switch 110, and to open the circuit through the switch to the coil 90 of the relay 92. At this time, although the circuit through the coil 90 is open, the potentiometer associated with the coil supplies sufficient voltage to maintain relay 92 closed so that coil 106 is energized to actuate switch 110. Actuation of switch 110 closes the circuit through leads 116 to operate the electrical braking means for the motor 31 to reduce the speed thereof, and opens the circuit to the coil 127 of the relay 131 and this relay is then closed by the action of the spring 225. However, the circuit through the relay 131, the coil 212 of the relay 202 and through contacts 220 of the sensing device 223 remains open and de-energized at the switch 110 which permits the circuit through the relay 202 and the coil 192 to remain closed to thereby hold the switch 175 in actuated position. This maintains the circuit closed through the switch 175 and leads 207 to hold the mechanical braking means for the motor in released position.

When the speed of the motor 31 is reduced to the desired point by the electrical braking means, which is determined by the timed interval necessary to dissipate the holding action of the potentiometer in the circuit for the coil 90, the spring 102 operates the core member 91 to open the relay 92 and de-energize the circuit through the coil 106. The spring 117 immediately operates the core member 107 to open the circuit through the switch 110 and leads 116 to the electrical braking means of the motor 31 and closes the circuit through the switch 110 to and through the closed relay 131 to the coil 212 of the relay 202. Closing the circuit to the coil 212 also closes the circuit through the coil 127 of the relay 131, but due to the time delay characteristics of this relay it momentarily remains closed. When during the rotation of the sensing device 223 by shaft 26, the conductor 221 is brought into position to engage both contacts 220, the circuit through the coil 212 is energized to operate the core member 211 to open the circuit through the relay 202 to the coil 192 of the switch 175. The core member 191 of the switch 175 is immediately operated by spring 210 to open the circuit through leads 207 to permit operation of the mechanical braking means to stop the motor and to also open the circuit to the coil 51 of the switch 47. The sensing device 223 carrying the conductor 221 is so positioned on the shaft 26 and the action of the mechanical braking means is such that the motor 31 and machine is completely stopped in the interval between the time that the conductor closes the circuit through the contacts 220 to institute the mechanical braking action and the time the conductor again engages the contacts, the stopping preferably occuring when the needles are at or near the lowest position in their operating cycle. Following the stopping of the machine the relay 131, which was under the control of a time delaying action, is operated by the coil 127 to again open the circuit to the coil 212 at the relay.

When the contact 160 of the switch 151 is moved to disengage the contact 155 and engage the contact 150, which occurs when the tension in the yarns 22 becomes excessive, the circuit through the coil 51 is opened and de-energized and the switch 47 is operated by the spring 52 to open the circuit through leads 42 to the motor 31 and to institute the operation of the electrical and mechanical braking means to stop the motor, as above set forth. Engagement of the contact 160 with the stationary contact 150 also closes the circuit through the switch 151, lead 147, movable and stationary contacts 141 and 135, respectively, of the relay 140, and lead 132 to the coil 106 of the switch 110. The closing of this circuit also closes and energizes the circuit through the coil 145 of the relay 140 which is of the type having time lag means which momentarily prevents the core member 142 from operating. When the core member 142 is operated by the coil, the movable contact is moved to disengage the contact 135 and engage the contact 136; this action opens the secondary circuit through the relay 140 to the coil 106 and closes the secondary circuit through the relay to the contact 121 of the switch 110. However, opening this circuit to the coil does not affect the coil 106 as at this time the coil remains energized through the relay 92. When the relay 92 is again operated to open the circuit through coil 106, the switch 110 is operated to close the circuit through relays 131 and 202 to effect the operation of the mechanical braking means for the motor 31, as hereinbefore set forth. Following movement of the contact 160 to engage the contact 150 and after adjustments are made correcting the defect which caused operation of the switch 151, the switch is manually operated to return the movable contact 160 into engagement with the contact 155, to close the circuit to the coil 51 and again open the circuit through the relay 140.

When it is desired to operate the motor 31 and machine to move the elements through slight movements without bringing the motor up to high operating speed, which lower speed is generally referred to as the jogging speed, such operation occurring particularly at the time a fresh supply of yarns is started on the machine, the switch 82 is manually opened to open the holding circuit for the coil 51 through the switches 47 and 61 and to open the circuit through the switch 47 and relay 92 to the coil 106 of the switch 110. Thereupon, by manually depressing the start button 66 to close the circuit through the coil 51 and again releasing this button to open the circuit through the coil, the switch 47 is so controlled as to operate the motor and machine through only partial cycles. If, however, the start button 66 is accidently retained in depressed position, the motor may attain a speed sufficient to operate the machine through a number of cycles which very often causes the new yarns to be excessively tensioned. When this occurs, the button 161 is operated to move the contact 160 of switch 151 to disengage the contact 155 and engage the contact 150 which action opens and de-energizes the circuit through the coil 51 which permits operation of the switch 47 to open the circuit to the motor 31. Operation of the switch 151 also closes the circuit through movable and stationary contacts 141 and 135 to the coil 106 which is thereby energized to operate the switch to close the circuit to the electrical braking means of motor 31. Simultaneously, the circuit through the coil 145 of relay 140 is closed and energized but this relay, being controlled by time lag means, momentarily holds the circuit through the coil 106 closed to permit the electrical braking means to function to slow the speed of the motor. At the end of the timed cycle, the core member 142 is operated to move the contact 141 to open the circuit through the coil 106 and close the circuit to the contact 121 of the switch 110. As the switch 110 is operated to open the circuit to the electrical braking means, the circuit through relays 131 and 202 and sensing device 221 is closed as hereinbefore set forth to operate and open the switch 175 which permits the mechanical braking means to function to stop the motor 31.

It will be obvious from the foregoing that the construction and operation of the electrical control circuit of the instant invention is such that the machine may be brought to a complete stop from full operating speed at a predetermined point in an operating cycle of the machine. Further, the circuit provides an effective safeguard against continued operation of the machine when the various parts thereof become defective in operation.

I claim:

1. In a warp knitting machine having needles, a driving shaft, a non-reversible electric motor for operating said driving shaft, said motor having incorporated therein an electrical braking means and a mechanical braking means for stopping said motor, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means including a main switch for said motor, means for actuating said main switch for opening and closing the circuit to said motor, a normally open second switch for said electrical braking means, a relay connected to said main switch and acting to operate and close said second switch to actuate said electrical braking means when said circuit to said motor is opened, time delay means associated with said relay to maintain said second switch closed for a predetermined timed interval to slow the speed of said motor, a third switch for said mechanical braking means, a second relay for normally maintaining said third switch closed to hold said mechanical braking means inactive, and means acting in timed relation to the operation of said driving shaft to operate said second relay to open said third switch and activate said mechanical braking means to stop said motor.

2. In a warp knitting machine having needles, a driving shaft, a non-reversible electric motor for operating said driving shaft, said motor having incorporated therein an electrical braking means and a mechanical braking means for stopping said motor, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means, said control circuit including a main switch for said motor, means for actuating said main switch to open and close the circuit to said motor, a second switch for said electrical braking means, relay means operated by said main switch when said circuit to said motor is open to operate said second switch to close the circuit to and actuate said electrical braking means, time delay means associated with said relay means for actuating said second switch to open the circuit for said electrical braking means before said electrical braking means brings said motor to a stop, a third switch for said mechanical braking means, a second relay normally acting to close said third switch to maintain said mechanical braking means inactive, and means acting in timed relation to the operation of said driving shaft when said second switch is open to open said third switch and activate said mechanical braking means.

3. In a warp knitting machine having needles, a driving shaft, a non-reversible electric motor for operating said driving shaft, said motor having incorporated therein an electrical braking and a mechanical braking means for bringing said motor to a stop, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means said control circuit including a main switch for said motor, a normally open second switch for said electrical braking means, a third switch for said mechanical braking means, means normally closing said third switch to maintain said mechanical braking means inactive, means connecting said first and second switches acting to close said second switch and actuate said electrical braking means to reduce the speed of said motor when said main switch is opened to said motor, time delay means for opening said second switch before said electrical braking means brings said motor to a stop, and means connecting said second and third switches acting in timed relation to the rotation of said driving shaft when said second switch is opened by said time delay means to open said third switch and activate said mechanical braking means to stop said motor.

4. In a warp knitting machine having needles, a driving shaft for operating said needles through repeated knitting cycles, a non-reversible electric motor for said driving shaft, said motor having electrical braking means and mechanical braking means for stopping said motor to stop said machine, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means said control circuit including a main switch for controlling the circuit to said motor, a second switch controlling the circuit to said electrical braking means, a third switch controlling the circuit to said mechanical braking means, means for operating said main switch to close said circuit and start said motor, means for operating said main switch to open said circuit to said motor, means for operating said second switch to close said circuit and operate said electrical braking means to reduce the speed of said motor when said circuit to said motor is open, means to operate said second switch to open said circuit to said electrical braking means before said electrical braking means brings said motor to a stop, means for maintaining said third switch closed to close the circuit and hold said mechanical braking means inactive, and means operated by said driving shaft for opening said third switch to activate said mechanical braking means when said second switch is opened to stop said motor and machine with the needles in a predetermined position.

5. In a warp knitting machine having needles, a driving shaft, a non-reversible electric motor for operating said driving shaft, said motor having incorporated therein an electrical braking means and a mechanical braking means for stopping said motor, said electrical braking means being in the form of special windings which act to dissipate the electro-motive force generated in said motor during operation thereof and to supply a magnetic force to the rotor of said motor, in combination with an electrical control circuit for said motor and said electrical and mechanical braking means said control circuit including a main switch for said motor, means for actuating said main switch for opening and closing the circuit to said motor, a normally open second switch for said electrical braking means, a relay connected to said main switch and acting to operate and close said second switch to actuate said electrical braking means when said circuit to said motor is opened, timed delay means associated with said relay to maintain said second switch closed for a predetermined timed interval to slow the speed of said motor, a third switch for said mechanical braking means, a normally closed second relay for normally maintaining said third switch closed to hold said mechanical braking means inactive, means acting in timed relation to the operation of said driving shaft to open said second relay to open said third switch and activate said mechanical braking means to stop said motor, and timing means controlling the operation of said second relay to close said third switch to again inactivate said mechanical braking means.

6. In a warp knitting machine having a driving shaft, a non-reversible electric motor for operating said driving shaft, said motor having an electrical braking means and a mechanical braking means for stopping said motor to stop said machine, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means, said control circuit including a main switch, means for closing said main switch to energize said circuit to start said motor, means for opening said switch to de-energize said circuit to said motor, means for closing the circuit to said electrical braking means when said main switch is opened to reduce the speed of said motor, means for maintaining said circuit to said electrical braking means closed for a predetermined timed interval and then opening said circuit to said electrical braking means before said electrical braking means brings said motor to a stop, magnetic means for maintaining said mechanical braking means inactive, means for maintaining the circuit to said magnetic means energized, means for de-energizing said circuit to said magnetic means to activate said mechanical braking means to stop said motor, and means operated by said driving shaft for controlling the operation of said circuit de-energizing means for said magnetic means.

7. In a warp knitting machine having a driving shaft, a non-reversible electric motor for operating said driving shaft, said motor having electrical braking means and mechanical braking means for stopping said motor, said electrical braking means being in the form of special windings which act to dissipate the electro-motive force generated in said motor during operation thereof and to apply a magnetic force to the rotor of said motor, in combination with an electrical control circuit for said motor and said electrical and mechanical braking means, said control circuit including a main switch, means for closing said main switch to energize and start said motor, means for opening said main switch to de-energize said circuit to said motor, a normally open second switch for said electrical braking means, means including said main switch for operating said second switch to close the circuit to said electrical braking means when said main switch is opened, means for maintaining said second switch closed for a predetermined timed interval to reduce the speed of said motor, a third switch for said mechanical braking means, a relay for normally maintaining said third switch closed to hold said mechanical braking means inactive, and means including said second switch for operating said relay in timed relation to the operation of said driving shaft to open said third switch and activate said mechanical braking means to stop said motor after said second switch has been operated to open the circuit to said electrical braking means.

8. In a warp knitting machine having needles, a driving shaft, a non-reversible electric motor for operating said driving shaft, said motor having electrical braking means and mechanical braking means for stopping said motor, said electrical braking means being in the form of special windings which act to dissipate the electro-motive force generated in said motor during operation thereof and to apply a magnetic force to the rotor of said motor, in combination with an electrical circuit for said motor and said electrical and mechanical braking means, said control circuit including a main switch, means for closing said main switch to energize the circuit and start said motor, means for opening said switch to de-energize said circuit to said motor, a second switch controlling the circuit to said electrical braking means, a third switch controlling the circuit to said mechanical braking means, relay means connected to and actuated by said main switch for operating said second switch to close the circuit to said electrical braking means to operate said electrical braking means when said main switch is opened, said relay means acting to permit said second switch to be opened to open the circuit to said electrical braking means before said electrical braking means brings said motor to a stop, means for normally maintaining said third switch closed to inactivate said mechanical braking means, means for operating said third switch to open the circuit to the mechanical braking means to activate said mechanical braking means including means operated by said second switch and means operated by said driving shaft.

References Cited in the file of this patent

UNITED STATES PATENTS

| | | |
|---|---|---|
| 1,327,822 | Hellmund | Jan. 13, 1920 |
| 1,475,970 | Stephenson | Dec. 4, 1923 |
| 2,194,759 | Logan | Mar. 26, 1940 |
| 2,285,517 | Harvey et al. | June 9, 1942 |
| 2,482,954 | Weiss | Sept. 27, 1949 |
| 2,495,507 | Clark | Jan. 24, 1950 |
| 2,506,645 | Kellogg et al. | May 9, 1950 |
| 2,666,176 | Fath | Jan. 12, 1954 |
| 2,733,393 | Carlisle | Jan. 31, 1956 |
| 2,804,585 | Brillante et al. | Aug. 27, 1957 |